(12) United States Patent
Baynard et al.

(10) Patent No.: US 7,409,922 B1
(45) Date of Patent: Aug. 12, 2008

(54) BIRD FEEDER

(76) Inventors: D. Calvin Baynard, 6483 Hwy. 260, Manning, SC (US) 29102; David A. Baynard, 6529 Hwy. 260, Manning, SC (US) 29102

( * ) Notice: Subject to any disclaimer, the term of this patent is extended or adjusted under 35 U.S.C. 154(b) by 0 days.

(21) Appl. No.: 11/506,113

(22) Filed: Aug. 17, 2006

Related U.S. Application Data

(63) Continuation-in-part of application No. 11/103,395, filed on Apr. 11, 2005, now Pat. No. 7,373,901.

(51) Int. Cl.
*A01K 39/01* (2006.01)
(52) U.S. Cl. .................... 119/52.3; 119/57.9
(58) Field of Classification Search ............. 119/52.2, 119/52.3, 57.8, 57.9, 52.1; D30/121, 124, D30/127, 128
See application file for complete search history.

(56) References Cited

U.S. PATENT DOCUMENTS

| | | | |
|---|---|---|---|
| 905,278 A * | 12/1908 | Benefiel | 119/51.5 |
| 2,496,828 A | 2/1950 | Throckmorton | |
| 2,522,634 A | 9/1950 | Pittenger | |
| D174,139 S | 3/1955 | Sadler | |
| 2,931,336 A | 4/1960 | Cather | |
| 2,961,995 A | 11/1960 | Martin | |
| 3,090,354 A | 5/1963 | Merritt et al. | |
| 3,780,703 A | 12/1973 | Boehland, Jr. | |
| 4,188,913 A * | 2/1980 | Earl et al. | 119/57.9 |
| 4,259,927 A * | 4/1981 | Clarke | 119/57.9 |
| 4,389,975 A | 6/1983 | Fisher, Jr. | |
| 4,498,423 A | 2/1985 | Gainsboro et al. | |
| 4,558,662 A | 12/1985 | Peterson | |
| 4,765,277 A | 8/1988 | Bailey et al. | |
| 4,942,845 A * | 7/1990 | Lane | 119/52.2 |
| 5,062,390 A | 11/1991 | Bescherer et al. | |
| D330,097 S | 10/1992 | Bescherer et al. | |
| D333,538 S | 2/1993 | Kingsley | |
| 5,195,460 A * | 3/1993 | Loken | 119/57.9 |
| 5,291,855 A | 3/1994 | Laverty | |
| 5,507,249 A | 4/1996 | Shaw | |
| 5,558,040 A * | 9/1996 | Colwell et al. | 119/52.2 |
| 5,775,257 A | 7/1998 | Park | |
| 6,986,322 B2 * | 1/2006 | Lumpkin et al. | 119/52.3 |

* cited by examiner

*Primary Examiner*—T. Nguyen
(74) *Attorney, Agent, or Firm*—McNair Law Firm, P.A.

(57) ABSTRACT

A bird feeder having an upstanding circular housing with a pivotally mounted cover movable between a closed position and a raised position. A latch assembly is included which operates to release the cover for raising and locking the cover in closed position. A feed assembly is provided which includes a perch adjustable laterally of a feed opening. The position of the perch relative opening allows the feeder to restrict the size of the bird being fed.

12 Claims, 5 Drawing Sheets

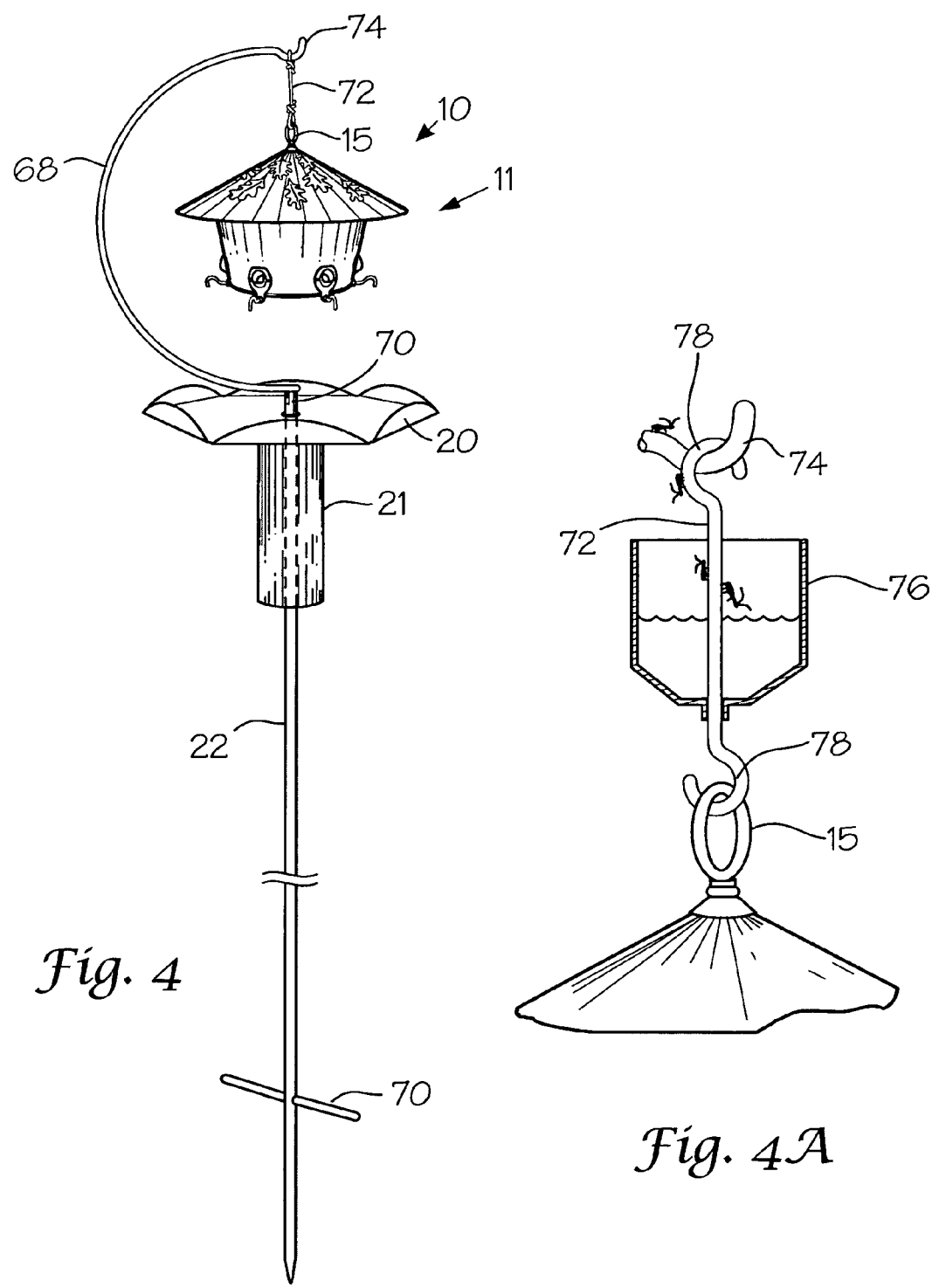

BIRD FEEDER

CROSS REFERENCE TO RELATED APPLICATION

This application is a continuation-in-part of U.S. application Ser. No. 11/103,395; filed Apr. 11, 2005 now U.S. Pat. No. 7,373,901, having the same title, the disclosure of which is herein incorporated.

BACKGROUND OF THE INVENTION

This invention is directed to a bird feeder which is constructed with the ability to be selective between the birds which can feed from it. The feeder is also constructed with multiple protections against squirrels, ants or other unwanted critters feeding. The feeder includes apparatus for preventing food waste, for providing plural feed stations each associated with an individual food supply, and for ease of refilling the various food supplies.

Accordingly, it is an object of this invention to provide a sturdy, attractive bird feeder.

Another object of this invention is to provide a bird feeder capable of selectively sizing the birds being fed.

Another object of the invention is a bird feeder with multiple and individual feed supply areas.

Another object of the invention is a bird feeder in which the roof or cover is pivotal between an open position and a closed position.

Another object of the invention is a bird feeder in which the roof or cover pivots into an open position allowing access to the feed supply areas.

Another object of the invention is a bird feeder system which includes protector apparatus repelling crawling insects and squirrels.

Another object of the invention is a bird feeder constructed with multiple squirrel guards.

Another object of the invention is a bird feeder mountable from above or below.

Another object of the invention is a bird feeder system which includes variable and adjustable mounting members.

SUMMARY OF THE INVENTION

The above objectives are accomplished according to the present invention by providing a bird feeder having a housing which includes a vertically directed circular side wall connected with an upwardly directed cone-shaped flooring and an open upper end. A cover is pivotally mounted with the side wall and is adapted to be pivoted over the open upper end between a closed position and an open position. A plurality of openings are arranged about the side wall adjacent its lower end and a plurality of feed assemblies are positioned adjacent the openings. A perch is positioned beneath each opening. Each perch is horizontally adjustable relative to each opening into selected positions.

The cover is adapted to be raised to allow food to be supplied through the open upper end. The food is directed downwardly and outwardly into positions adjacent the openings. The cover is then pivoted to a closed position and each perch is adjusted into a horizontal position relative to the openings to selectively determine the size of the bird capable of feeding through the associated opening.

The feeder includes an opening through the apex of the flooring which carries a shaft connected with the flooring and extends through the opening vertically into the housing. The shaft is adapted to receive an upper end of a support shaft for supporting the housing in an elevated position.

A ring is engaged with the cover and is operative to connect with a depending support for hanging the feeder in an elevated position.

A collection tray which includes upturned edge portions is carried by the pole in a vertically spaced position beneath the housing. The edge portions are shaped to form drainage ways about the periphery of the tray. The collection tray has a diameter greater than the diameter of the housing.

The feed assembly includes a collar mounting a spout secured with the side wall. The perch is carried by said collar. Each feed assembly includes a generally longitudinally extending rod which is carried by the collar. The outer portion of the rod is offset from its longitudinal axis. The offset of the rod forms a perch.

A squirrel guard which comprises a downwardly directed tubular extension is secured with the pole extending from beneath the collection tray. The squirrel guard may alternatively be secured beneath and with the housing by inner ends of each of the rods. The feeder includes a hook and latch connected with the side wall and the cover. The latch and hook are adapted to be engaged to lock the cover in its closed position and released allowing the cover to be pivoted to its open position.

A bird feeder which includes a circular housing having a food containment area, a plurality of feed openings arranged about the housing and a cover pivotable between a locked closed position and an open position providing access and cover for the food containment area. The housing includes a housing support for engaging with a housing support member, which member maintains the housing in an elevated position. The housing support member may comprise an elongated pole of a first diameter having an upper end having a shoulder and a projection of diameter less than the first diameter. The housing support is adapted to engage with the upper end of the pole for supporting the feeder in an elevated position. The pole forming the housing support member is formed with a first diameter and includes an upper end including a shoulder and a projection of a reduced diameter. An extension formed with the first diameter has a lower end which includes a recess and an upper end which includes a shoulder and a projection formed at a reduced diameter. The housing support may be engaged with the shoulder and projection of the extension while the recess of the extension is engaged with the projection and shoulder of the pole. The combination acts to support the feeder in an extended elevated position.

The support may include a C-shaped support having a receptacle at a first end and a hook at a second end. The hook acts to engage with and support the feeder while the receptacle is operative to engage with the upper end of the pole. A flexible cable or a rigid bar may engage between the feeder and the hook. A mote may be engaged with the general mid-section of the cable or bar between its upper and lower hook. The mote, which comprises a container, is in fixed position with the cable or bar. The upper hook of the cable or bar is engaged with the C-shaped support and the lower second hook is engaged with the housing support member for supporting the feeder in a hanging position. The housing support may comprise a ring secured with the cover.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 4 is a side view of the feeder with an alternative pole mounting assembly.

FIG. 4A is a side view of a hanging assembly including an ant mote.

DESCRIPTION OF A PREFERRED EMBODIMENT

Referring in more detail to the drawings, the invention will now be described in more detail.

Figure 1:
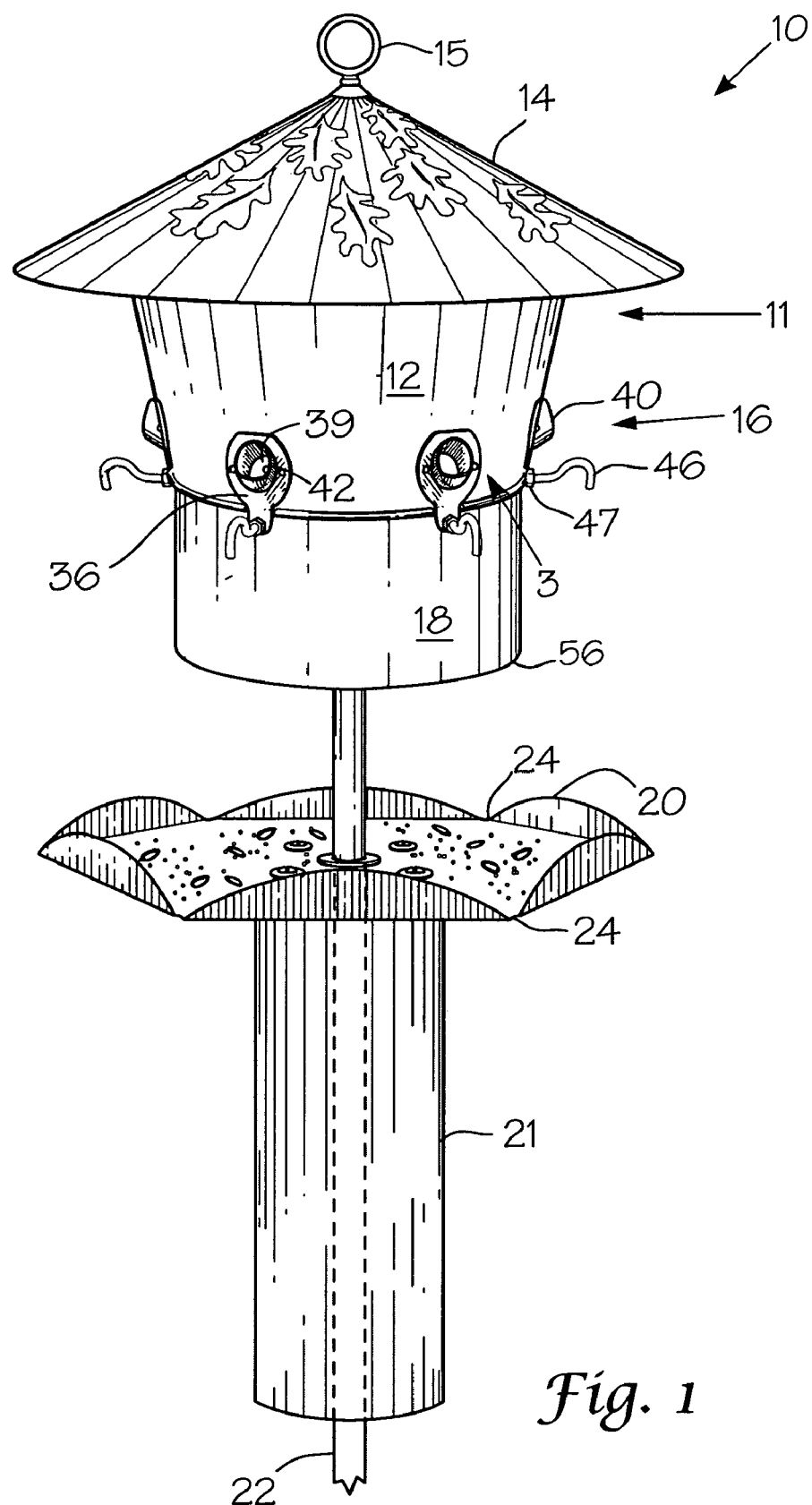
FIG. 1 is a perspective view of the feeder of the invention.
Figure 2:
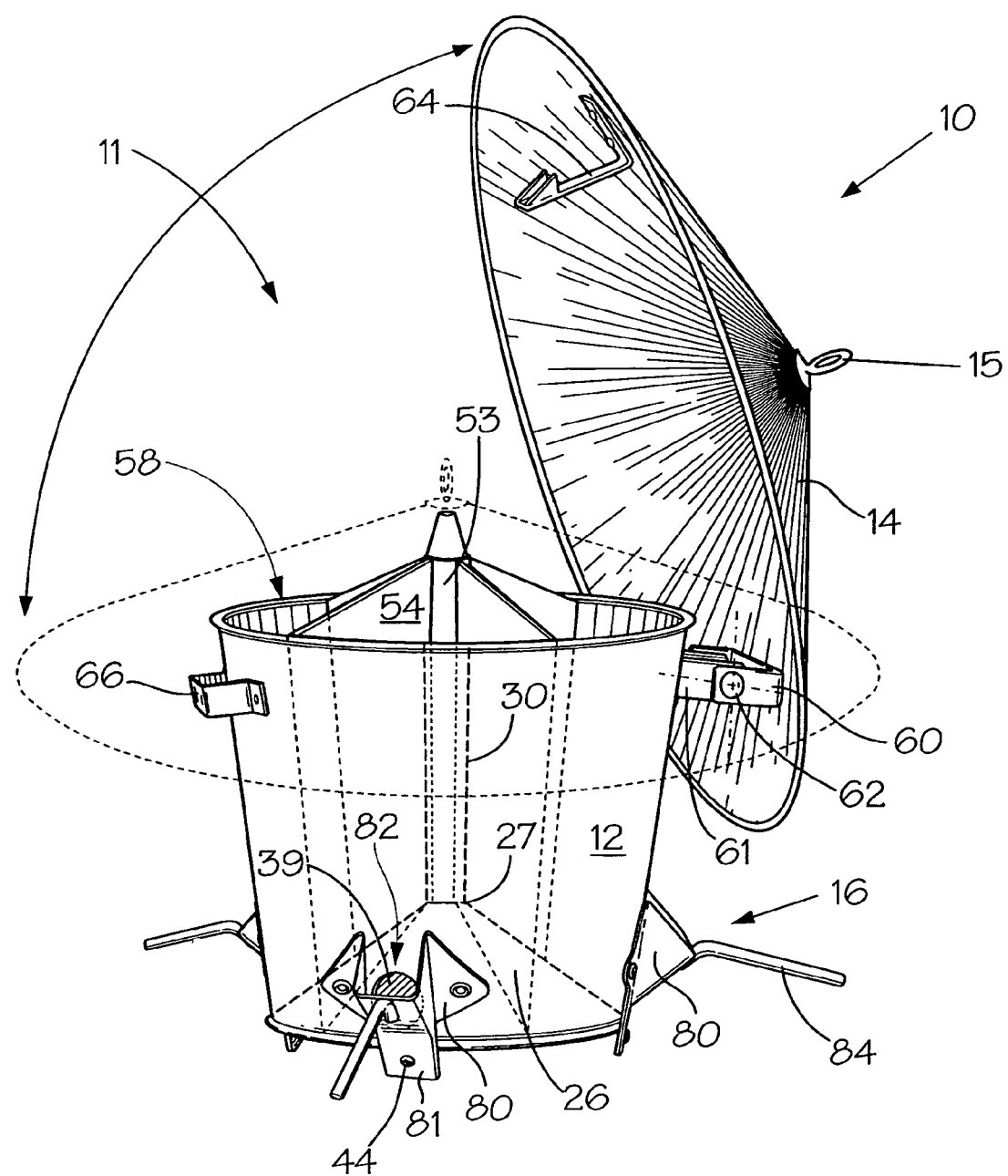
FIG. 2 is an isolated perspective view of the feeder with the roof in the raised position.
Figure 3:
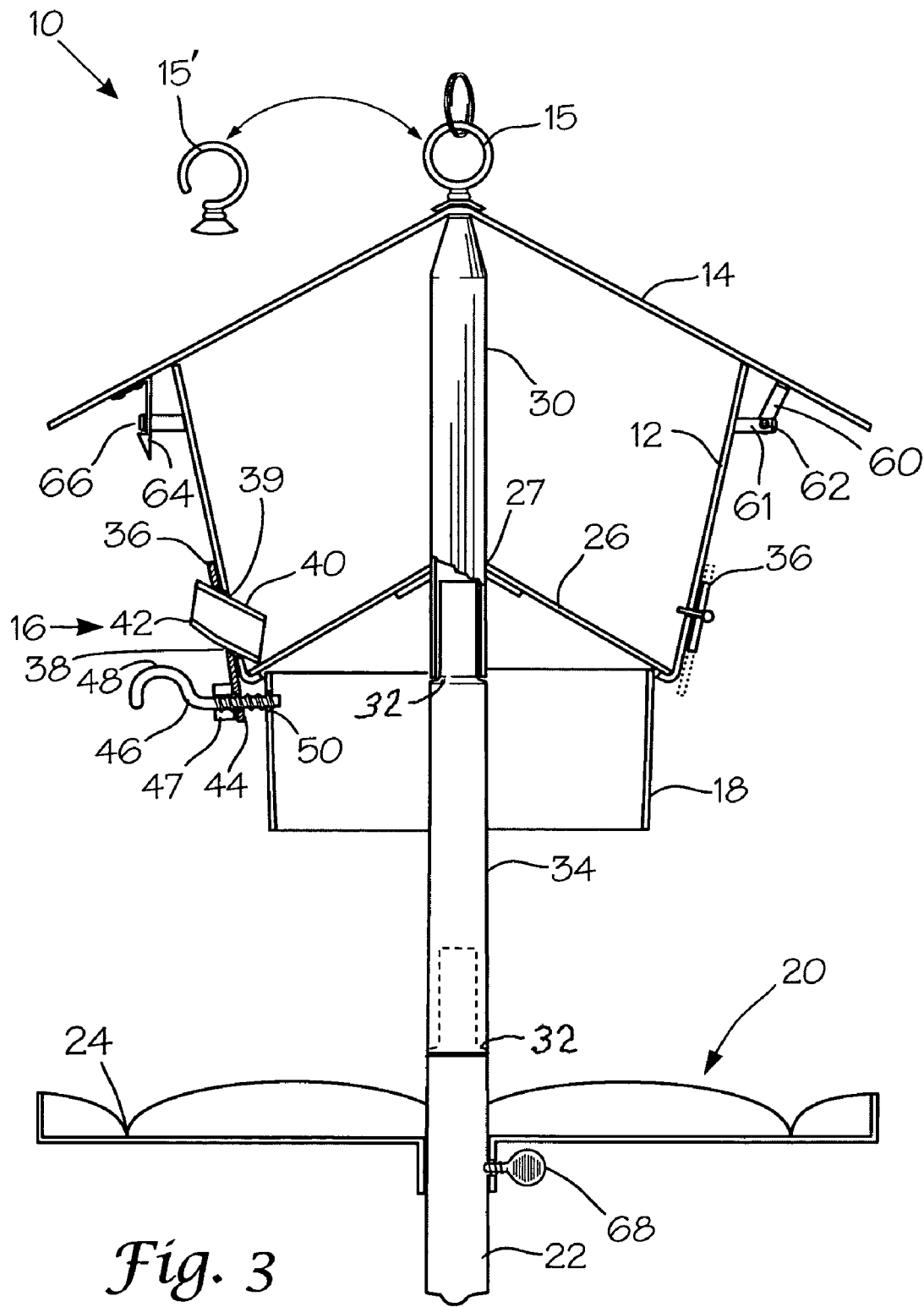
FIG. 3 is a side view of the feeder of the invention including a mounting pole.

A typical bird feeder according to the invention is shown in FIGS. 1-3. Feeder 10, which is preferably made of metal, includes housing 11 having a circular outer wall 12, a generally cone-shaped cover or roof 14, a plurality of feeding assemblies 16 and in most cases a hanging support member or ring 15. Mounted with housing 12 is a squirrel guard 18. Pole or shaft 22 passes through squirrel guard 18 and is secured with the underside of housing 11, supporting the feeder in an elevated position above the ground. Collection tray 20 is carried by pole 22 at a selected distance from the lower edge of the squirrel guard.

Outer wall 12 is slightly cone-shaped with an upper end diameter of about 15" and a lower end diameter of about 12". The housing is about 8" tall. These dimensions are completely optional and variations, both larger and smaller, are possible.

Cover or roof 14 is constructed to overhang or extend beyond outer wall 12 by about 3". This overhang, in combination with the downward slope of the cover, provides both a squirrel guard and prevents rain from entering into the storage area, wetting the feed.

The lower end of housing 12 is turned under or inwardly crimped as shown in FIG. 3 and as better described in co-pending application Ser. No. 11/103,395. Flooring 26 is generally cone-shaped in an upward direction as shown in FIGS. 2 and 3. Flooring 26 is secured about its outer edge with the turned under or crimped lower end of housing 12. Flooring 26 is secured with housing 12 preferably by welding, although other methods such as adhesives or simply crimping together are satisfactory. The flooring is arranged to extend along an angle of about 30°.

An opening 27 is formed in the apex of flooring 26. A support collar having a central opening is preferably secured with the flooring about opening 27. Normally, the collar is made of heavier metal than the cover, housing or flooring. A hollow shaft 30 extends through the collar and opening 27 and is secured in fixed position relative to the side walls and flooring. The upper end of hollow shaft 30, which may be of reduced diameter, is located above the open upper end of side wall 12 but below the peak of cover 14 as shown in FIGS. 2 and 3.

Ring 15 secures with cover 14 and acts to support feeder 10 when hung from its upper side. The lower end of hollow shaft 30 is open beneath floor 26 and is adapted to receive the upper end of a pole or pole extension, such as pole or shaft 22 or pole or shaft extension 34, for supporting the feeder from its bottom or lower side in an elevated position.

Figure 1A:
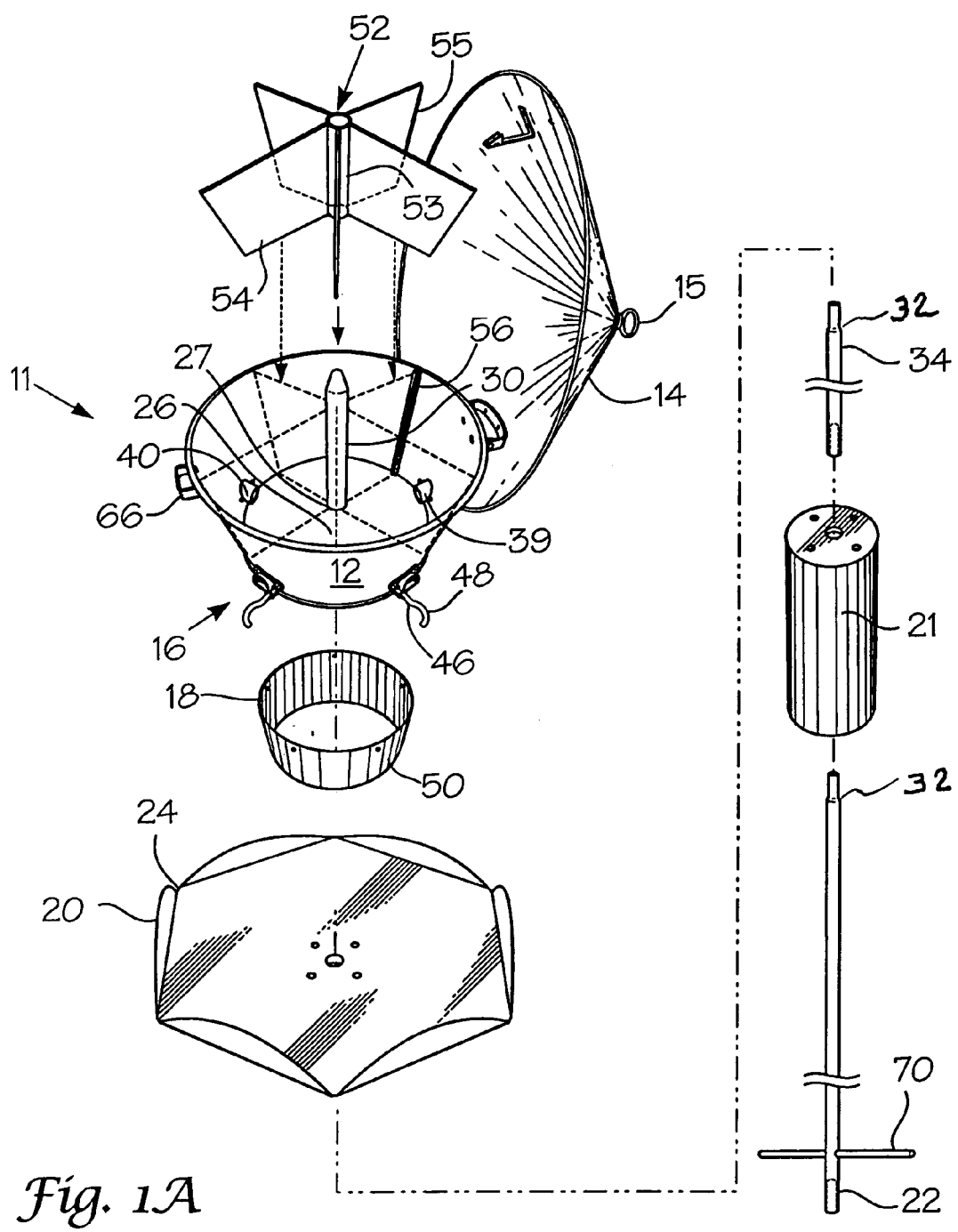
FIG. 1A is an exploded perspective view of the feeder of FIG. 1 minus squirrel guard 21.

Arranged about sidewall 12, as shown in FIGS. 1, 1A and 3, adjacent its lower end are a plurality of feeding assemblies 16, preferably five. Each feeding assembly may include collar 36, formed with an opening 38. A tubular spout 40 may be positioned in each opening and be secured with the collar along an angle of about 45°. Spouts 40 comprise a tube of about 1" in diameter and length. Collars 36 are formed of heavier metal than side wall 12. If desired, spout 40 may be omitted and the collar may be shaped as shown in FIG. 2 and hereinafter described.

A plurality of openings 39 are arranged about the outer wall adjacent its lower end. The collar 36 is positioned over each opening 39 with spout 40 passing through both of openings 38, 39 with its inner end positioned adjacent the outer edge of flooring 26. The collars are fixed to the side wall by brads or other suitable means.

The outer end of spout 40 along its lower portion is bent upwardly to extend along an angle of about 40° and forming lip 42. Lip 42 acts as a shield or retainer which prevents feed from spilling or being pulled out by a feeding bird as it withdraws its head during feeding. While lip 42 does not totally prevent spillage, it significantly reduces the amount of feed lost as it is pulled out of the spout. Also, lip 42 acts to shield the feed from rainwater and snow.

Adjacent the upper edge of outer wall 12 are a pair of projections 61 which extend laterally, best seen in FIGS. 2 and 3. Also, a pair of projections 60 extend downwardly from the underside of cover 14. Projections 60 and 61 overlie each other adjacent their outer ends forming pivot 62. Pivot 62 allows cover 14 to pivot between a raised feed position as shown in FIG. 2 and a closed normal position as shown in FIGS. 1 and 3.

A latching arrangement including a U-shaped catch 66 is secured adjacent the upper edge of outer wall 12 opposed to pivot 62. A projecting hook 64 is secured to the lower side of cover 14 in position to extend through and engage with catch 66 when the cover is in its closed position. The projecting hook 64 engages beneath catch 66 when cover 14 is in the closed position locking the cover in position. The hook may be pressed inward and away from catch 66 when it is desired to move the cover into the feed position. When cover 14 is in the feed position, all storage bins 58 are clear for supplying with feed.

As best seen in FIG. 3, rod 46 extends through a threaded bore 44 in collar 36 and is locked in position with locking nut 47. The inner end of rod 46 may engage with squirrel guard 18 through threaded bores 50 securing it in position with housing 11.

The outer end of rod 46 is generally hook shaped forming perch 48 outwardly of opening 39 and lip 42.

In use, rod 46 is screwed into bore 44 of collar 36 a distance to position perch 48 a desired distance from the outer end of spout 40. Rod 46 is always positioned with perch 48 in an upward position relative to its axis as shown in the drawings. When perch 48 is located in the desired axial position outwardly of spout 40, locking nut 47 is tightened against collar 36 locking rod 46 in fixed position.

It is noted that the distance at which perch 48 is positioned from spout 40 determines the size bird capable of feeding through the spout. Only small birds can feed when the perch is in its most inward position while large and small birds can feed from the perch when in its most outward position. Of course, an intermediate position would allow only small and intermediate size birds to feed.

It is noted that due to the angle of perch 48 relative to opening 38, the birds must be positioned sideways relative to the opening. This requires that the birds pick the feed rather than raking it out. Less feed is wasted as a result.

In another arrangement, shown in FIG. 2, collar 80 is bent to form a channel 82 which is positioned about the outer and lower areas of opening 39. Collar 80, which is secured with outer wall 12 as earlier described, is shaped so that channel 82 extends upwardly at about 45° forming a barrier to prevent spillage. An extension or tab 81 extends downwardly from collar 80 adjacent the inner end of channel 82. Tab 81 includes bore 44 which may be utilized to mount squirrel guard 18 and rod 46 containing perch 48 in the manner earlier described.

In an alternative arrangement a perch 84, comprising a bent rod, is attached in fixed position with the outer surface of collar 80 in position aligned beneath and with channel 82. In this arrangement, perch 84 is not adjustable with suitable mounting. An additional perch arrangement could comprise a ring secured outwardly of and with tabs 81 forming a continuous perch around housing 11.

Squirrel guard 18 comprises a circular extension of between 4" and 10" in length. Guard 18 is of a diameter slightly less than the diameter of the lower end of side wall 12. Along the upper edge of the guard there are provided a plurality threaded bores 50 which are radially spaced to align with the bores through collars 36.

When a pole is used to mount the feeder in an elevated position, it may be desirable to position a collection tray 20 beneath housing 11. (See FIGS. 1, 1A, 2 and 4.) The collection tray is generally flat with an upturned outer edge and a diameter slightly larger than that of cover 14. The outer edge is upturned along a plurality of sections forming drainage opening 24 between adjacent raised sections. The collection tray acts to catch feed drawn over lip 42. Collection tray 20 catches this feed and presents it for ground feeding birds. It also functions as an additional or alternative squirrel guard. Collection tray 20 may be secured with pole 22 by way of a locking screw 68 or its top center opening may be sized to rest on shoulder 32 of rod 22.

If desired, an alternative squirrel guard 21 may be attached beneath or to the underside of tray 20 by way of screws as shown in FIGS. 1 and 1A. Squirrel guard 21 may be about 18" or 20" in length with a diameter of only about 6". There may be ring guides formed on the inner side of the squirrel guard which act to keep the guard axially aligned with pole 22. These rings may include locking screws, such as shown at 68 in FIG. 3, which engage with the pole to lock the guard in position. Alternatively, the upper ring of these rings may be of reduced diameter which will fit over the upper end of pole 22 or extension 34 but rests on shoulder 32.

Turning now to FIGS. 1A and 2, housing 11 is shown with the cover raised. A divider which comprises a plurality of fins 54 extending outwardly from hollow extension 53. Fins 54 are arranged so that when extension 53 is positioned over hollow shaft 30 the lower ends of fins 54 substantially engage with the flooring along their length and their outer ends substantially engage with side wall 12 along their length. The divider is positioned within housing 11 with fins 54 on opposing sides of each feeding assembly 16 forming individual storage bins 58 for each opening 39. A groove is formed vertically along side wall 12 in position to engage with an end portion of a single fin 54, locking the divider in position relative each opening 39 and against rotation.

In use, hook 64 is disconnected from catch 66 and top 14 is pivoted into the raised position. Feed is supplied to the various storage compartments or areas 58. The feed may comprise different types to each storage area. The feed migrates to a position adjacent the outer edge of floor 26 adjacent lower end of side wall 12 and opening 39 due to the configuration of the floor. Perch 84 is in fixed position while perch 48 is axially adjustable to determine the size of the bird as earlier noted, relative to the outer end of opening 39 and spout 40. Cover 14 is returned to the closed position with hook 64 engaged with catch 66. The feeder is now ready to be positioned in an elevated position either by hanging or positioning atop a pole. It is noted any known type latch arrangement may be substituted for the hood and catch arrangement shown.

Alternative pole mounting arrangements are shown in FIGS. 1A, 3 and 4. In these arrangements, pole or shaft 22 is mounted in the ground. There may be provided projections 70 to assist in pushing the pole into the ground. Adjacent its upper end there may be provided a pole or shaft extension 34. The pole extension comprises an upper end of reduced diameter terminating with a shoulder 32 and a lower end comprising a recess. The upper end of the pole includes also an area of reduced diameter forming a shoulder 32 which is designed to fit into the recess while the upper end of reduced diameter of extension 34 fits into hollow shaft 30 for supporting feeder 11 in an elevated position.

Pole 22 as shown in FIG. 1A is operative to engage directly with hollow shaft 30 in the manner described above.

A C-shaped support member 68, as shown in FIG. 4, is connectable with the upper end of pole 22 or extension 34 through a connector formed adjacent its lower end as indicated by 70. The connector connection preferably is a sleeve which fits over the reduced diameter portion of the pole and engages with shoulder 32. The connection could be with the upper end of pole 22 and could include threaded sections allowing screwed engagement.

A C-shaped support member 68, as shown in FIG. 4, is connectable with the upper end of pole 22 or extension 34 through a connector formed adjacent its lower end as indicated by 70. The connector connection preferably is a sleeve which fits over the reduced diameter portion of the pole and engages with shoulder 32. The connection could be with the upper of pole 24 and could include threaded sections allowing screwed engagement.

The opposite end of support 68 includes a hook 74 which connects directly with an extension 72 which then connects with ring 15 or ring 15 connects directly with hook 74. Extension 72 may comprise a wire or a rod. In either case, feeder housing 11 hangs in the open area of the C of support 68 above the end of pole 22. In an alternative arrangement, support 68 may comprise a loop or even a pair of loops with the housing hanging in its center.

An alternative arrangement for extension 72 could comprise mote 76 secured therewith. Extension 72, which passes through and is secured with the center of mote 76, by any suitable means such as welding, includes upper and lower hooks 78. Hook 78 engages with ring 15 and hook 74 to support the feeder. Mote 76 is filled with water forming a barrier which prevents ants and other crawling insects from reaching feeder 11.

The feeder is preferably made of all metal, however, other materials such as plastics are suitable for wholly forming the feeder or for forming selected components thereof. It is preferred that the housing, to include the flooring, squirrel guard and fins be made of steel. It is preferred that the collars are made of steel. It is preferred that the spouts are made of steel.

While a preferred embodiment of the invention has been described using specific terms, such description is for illustrative purposes only, and it is to be understood that changes and variations may be made without departing from the spirit or scope of the following claims.

What is claimed is:

1. A bird feeder comprising:
a housing having a vertically directed circular outer side wall connected about a lower end with an outer edge of an upwardly directed cone-shaped flooring and an open upper end;
a plurality of openings arranged about said outer side wall adjacent said lower end;
a plurality of feed assemblies positioned about said outer side wall adjacent said openings;
a perch positioned beneath each said opening, each said perch being laterally adjustable along a horizontal plane into selected lateral positions relative to said opening;
a cone-shaped cover pivotally mounted with said outer side wall and adapted to be pivoted between a lowered closed and locking position in which said open upper end is completely covered and a raised position in which said open upper end is uncovered, said cover mounting a ring;
a vertically extending hollow shaft passing through and connecting along its length with the apex of said cone-shaped flooring with its upper end positioned adjacent the apex of said cone-shaped cover in said closed position; whereby,
said cover when pivoted into said raised position uncovers said open upper end to allow food to be supplied into said housing and into positions adjacent said openings, said cover when pivoted into said closed and locked position provides, along with said hollow shaft, means capable of assisting in supporting said feeder in an elevated position.

2. The feeder of claim 1 wherein said ring and said cover being operative to connect with a depending support for supporting said feeder in said elevated position.

3. The feeder of claim 1 including a support shaft engaging in said hollow shaft supporting said housing in an elevated position and a collection tray having upturned edge portions carried by said support shaft in vertically spaced position beneath said housing, said edge portions forming drainage ways about said tray.

4. The feeder of claim 3 wherein said collection tray has a diameter greater than the diameter of said housing.

5. The feeder of claim 3 including a squirrel guard comprising a downwardly directed tubular extension carried by said support shaft beneath said collection tray.

6. The feeder of claim 5 wherein said squirrel guard is secured with said collection tray.

7. The feeder of claim 1 wherein each of said feed assembly includes a collar mounting a spout secured with said side wall, said perch being adjustably carried by said collar.

8. The feeder of claim 1 including a hook and latch connected with said outer side wall and said cover, said latch and hook being operative to be engaged, locking said cover in said closed position and released, allowing said cover to be pivoted to said open position.

9. The feeder of claim 1 including a C-shaped support having a receptacle
at a first end and a hook at a second end;
said hook being operative to engage with said cover and said support member to support said feeder; and,
said receptacle being operative to engage with an upper end of a pole.

10. The feeder of claim 9 including a flexible cable engaging between said cover and said hook.

11. The feeder of claim 9 including a mote engaging between said hook and said cover.

12. The feeder of claim 1 including a mote, said mote comprising a container, a first hook extending from within said container to a position above said container and a second hook extending from below said container downward, wherein;
said first hook is engaged with means supporting said feeder and said second hook is engaged with said support member and cover.

* * * * *